United States Patent
Lord (10) Patent No.: US 7,035,100 B2
(45) Date of Patent: Apr. 25, 2006

(54) UNIVERSAL PORTABLE COMPUTER STAND AND HIGH SPEED CONNECTIVITY CENTER

(75) Inventor: Charles Lord, Scottsdale, AZ (US)

(73) Assignee: Hotwire Development LLC, Scottsdale, AZ (US)

( * ) Notice: Subject to any disclaimer, the term of this patent is extended or adjusted under 35 U.S.C. 154(b) by 199 days.

(21) Appl. No.: 10/844,024

(22) Filed: May 12, 2004

(65) Prior Publication Data

US 2004/0233631 A1  Nov. 25, 2004

Related U.S. Application Data

(60) Provisional application No. 60/470,638, filed on May 15, 2003.

(51) Int. Cl.
G05K 1/16 (2006.01)
H05K 5/00 (2006.01)

(52) U.S. Cl. ..................... 361/686; 361/685
(58) Field of Classification Search .............. 361/686, 361/685
See application file for complete search history.

(56) References Cited

U.S. PATENT DOCUMENTS

| | | |
|---|---|---|
| 4,624,433 A | 11/1986 | Henneberg |
| 4,852,498 A | 8/1989 | Judd |
| D359,179 S | 6/1995 | Cucinotta |
| 5,503,361 A | 4/1996 | Kan-O et al. |
| 5,607,054 A | 3/1997 | Hollingsworth |
| 5,623,869 A | 4/1997 | Moss et al. |
| 5,678,800 A | 10/1997 | Markussen |
| 5,724,225 A * | 3/1998 | Hrusoff et al. .............. 361/683 |
| 5,751,548 A | 5/1998 | Hall et al. |
| 5,822,185 A | 10/1998 | Cavello |
| 5,927,669 A | 7/1999 | Sassman |
| 6,123,309 A | 9/2000 | Sage |
| 6,152,414 A | 11/2000 | Jondrow |
| 6,185,094 B1 * | 2/2001 | Ruch et al. ................. 361/686 |
| 6,256,193 B1 | 7/2001 | Janik et al. |
| 6,259,601 B1 | 7/2001 | Jaggers et al. |
| 6,549,401 B1 * | 4/2003 | Lin et al. .................... 361/686 |
| 6,556,435 B1 * | 4/2003 | Helot et al. ................. 361/686 |
| 6,583,985 B1 * | 6/2003 | Nguyen et al. ............. 361/686 |
| 2002/0159231 A1 | 10/2002 | Nguyen et al. |
| 2003/0103328 A1 * | 6/2003 | Hillis et al. ................. 361/687 |

FOREIGN PATENT DOCUMENTS

| | | |
|---|---|---|
| EP | 1244001 A2 | 9/2002 |
| GB | 8527155.1 | 8/1986 |

* cited by examiner

*Primary Examiner*—Lisa Lea-Edmonds
*Assistant Examiner*—Ingrid Wright
(74) *Attorney, Agent, or Firm*—Jackson Walker LLP; Robert C. Klinger

(57) ABSTRACT

An apparatus adapted to angle and space a laptop computer above a surface to facilitate user ease of use, the cooling thereof, and provide high speed connectivity thereto. The apparatus includes an adjustable stand device for mounting a notebook or tablet computer comprising at least a base 100, a first member 200 mounted on the base 100, a second member 300 slidably coupled to the first member 200, and a laptop backboard cradle 400 mounted on the second member 300. The second member 300 is arcuately slidable with respect to the first member 200 to allow backboard cradle 400 to be adjustably angled with respect to base 100 from a fully reclined position to a full height position. Along the sides of base 100 are located a plurality of USB input and output ports, some of which may be powered.

22 Claims, 15 Drawing Sheets

UNIVERSAL PORTABLE COMPUTER STAND AND HIGH SPEED CONNECTIVITY CENTER

CLAIM OF PRIORITY

This application claims priority under 35 U.S.C. Section 119(e) to U.S. patent application Ser. No. 60/470,638, Doss, et al., filed May 15, 2003, entitled "Universal Desktop Replacement System and High Speed Connectivity Center", the entire contents of which are incorporated herein by this reference.

FIELD OF THE INVENTION

The present invention is generally related to the field of computers stands, and more particularly to an apparatus for adjustably supporting, cooling and providing connectivity to a laptop computer or tablet computer.

BACKGROUND OF THE INVENTION

Laptop and tablet personal computers are valued for their portability. Yet the same characteristics that make these computers valuable for portable use are perceived as disadvantages when used in a desktop or primarily stationary setting. These disadvantages include poor user access to input devices such as keyboards and touch pads, poor screen visibility, improper ventilation and lack of peripheral connectivity.

Accordingly, there exists a need for a computer stand that improves the ergonomics of the input devices, making it easier for users to use the laptop or tablet computer without added physical strain, allows the display device to be fixedly held by means of an angle adjustment mechanism so as to be easily seen, facilitates an improved flow of cool air under a laptop computer for cooling thereof and has a plurality of input and output ports that can be coupled to the laptop or tablet computer and to peripherals.

SUMMARY OF THE INVENTION

The present invention achieves the technical advantages as an apparatus adapted to angle and space a laptop computer above a surface to facilitate user ease of use, the cooling thereof, and provide high speed connectivity thereto. More specifically, the present invention provides enhanced ergonomics for the user of the laptop or tablet computer so as to reduce hand, neck, and back strains, adjustably angles the laptop above a surface so as to improve the usable life span of the laptop or tablet computer by allowing cooling through the bottom thereof, and provides a variety of data and power connection ports to couple the laptop or tablet computer through the stand to peripherals, such as keyboards, mice, joysticks, palm devices, external storage devices, digital cameras, MP3 players and the like. The present invention also provides an adjustable stand which can fix a display device of a laptop computer and at the same time can adjust the tilt angle of the display device to a desired value.

BRIEF DESCRIPTION OF THE DRAWINGS

Advantages of the invention and the specific embodiments will be understood by those of ordinary skill in the art by reference to the following detailed description of preferred embodiment taken in conjunction with the drawings, in which.

DETAILED DESCRIPTION OF THE INVENTION

The numerous innovative teachings of the present applications will be described with particular reference to the preferred embodiment disclosed herein. However, it should be understood that this class of embodiments provides only a few examples of the many advantageous uses and innovative teachings herein. In general, statements made in the specification of the present application do not necessarily delimit any of the various claimed inventions. Moreover, some statements may apply to some inventive features, but not to others.

The present invention comprises an adjustable stand device for mounting a notebook computer or pen-input tablet computer comprising at least a base 100, a first member 200, a second member 300 and a backboard cradle 400. Each of these major components can be fabricated from materials such as a resilient plastic, formed in a molding process. Further, each major component may be comprised of subcomponents. For example, as disclosed herein, the base may be comprised of a single formed component or a plurality of components that are coupled together using glues, screws or other fastening mechanisms.

Figure 1A:
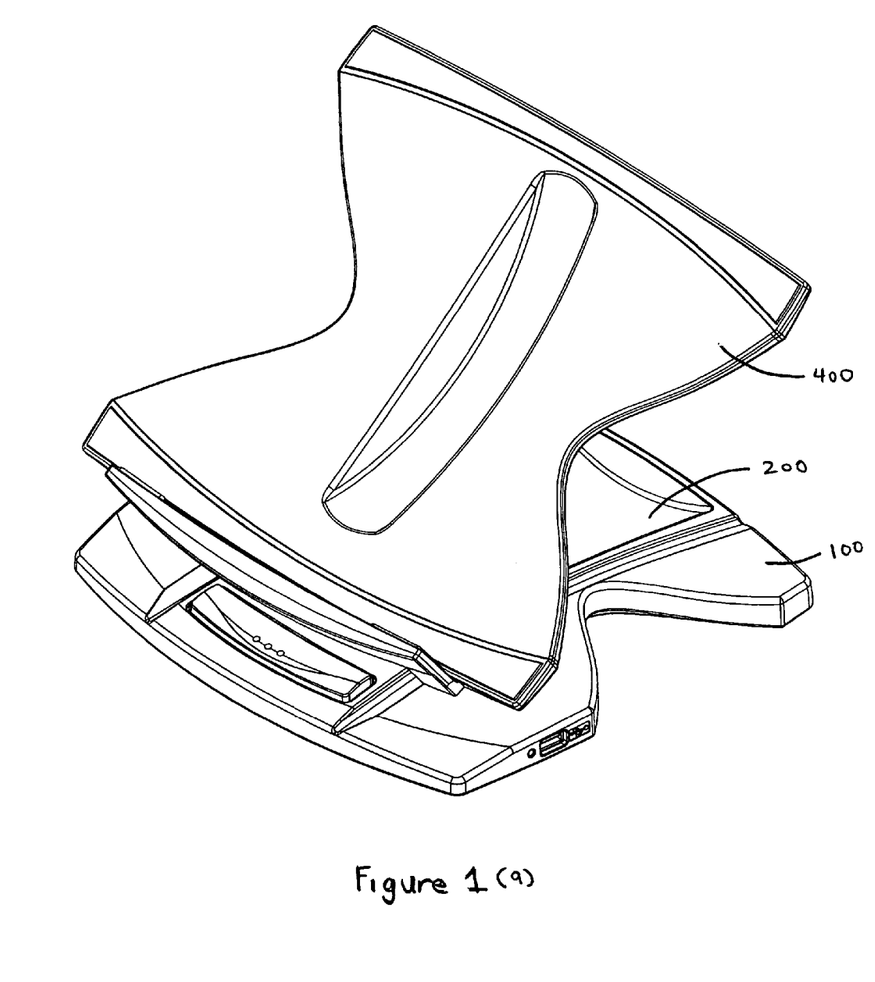
FIG. 1(a) is a perspective view of the present invention.
Figure 1B:
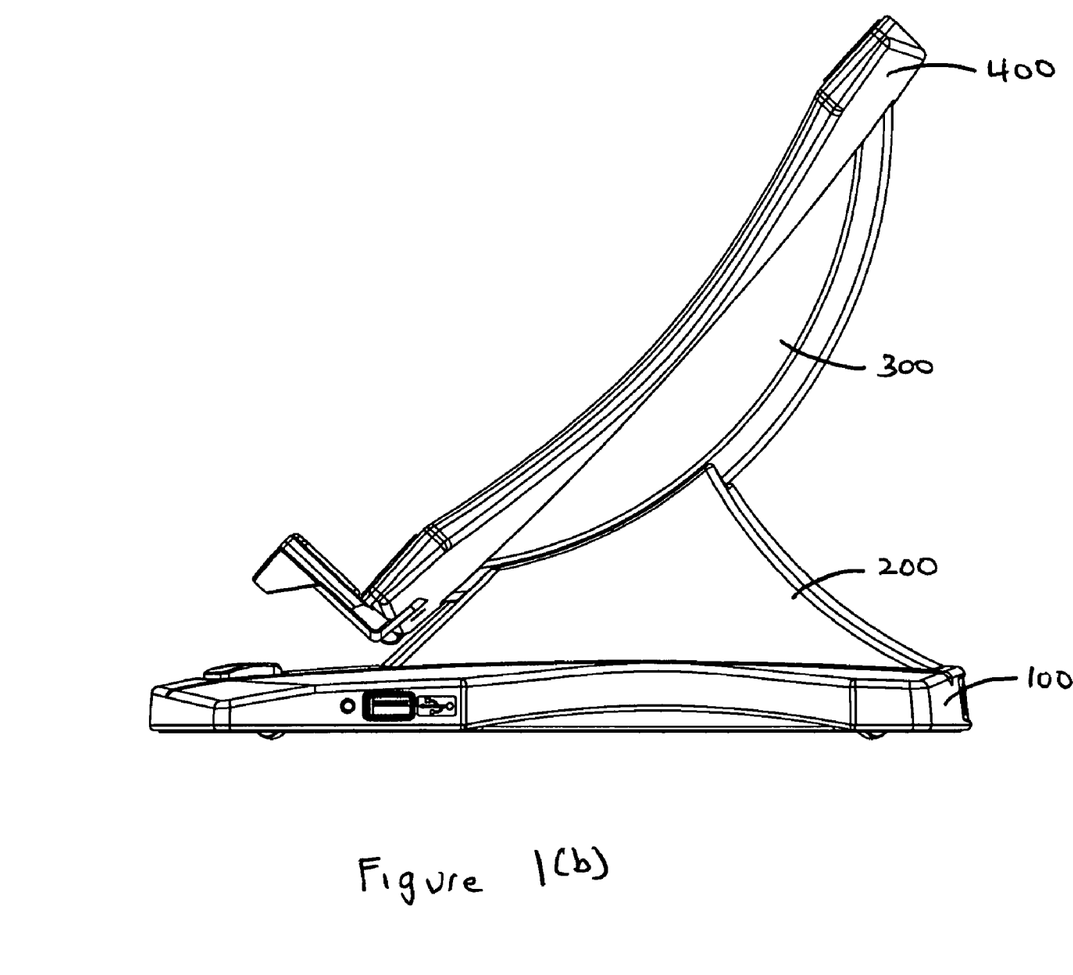
FIG. 1(b) is a side view of the present invention.

FIG. 1(a) provides a perspective view of the present invention showing the base 100, a portion of the first member 200 and the front of the backboard cradle 400. As seen in the side view of FIG. 1(b), the backboard cradle 400 is mounted on second member 300, second member 300 is arcuately slidably coupled to first member 200 and first member 200 is coupled to base 100.

Figure 1C:
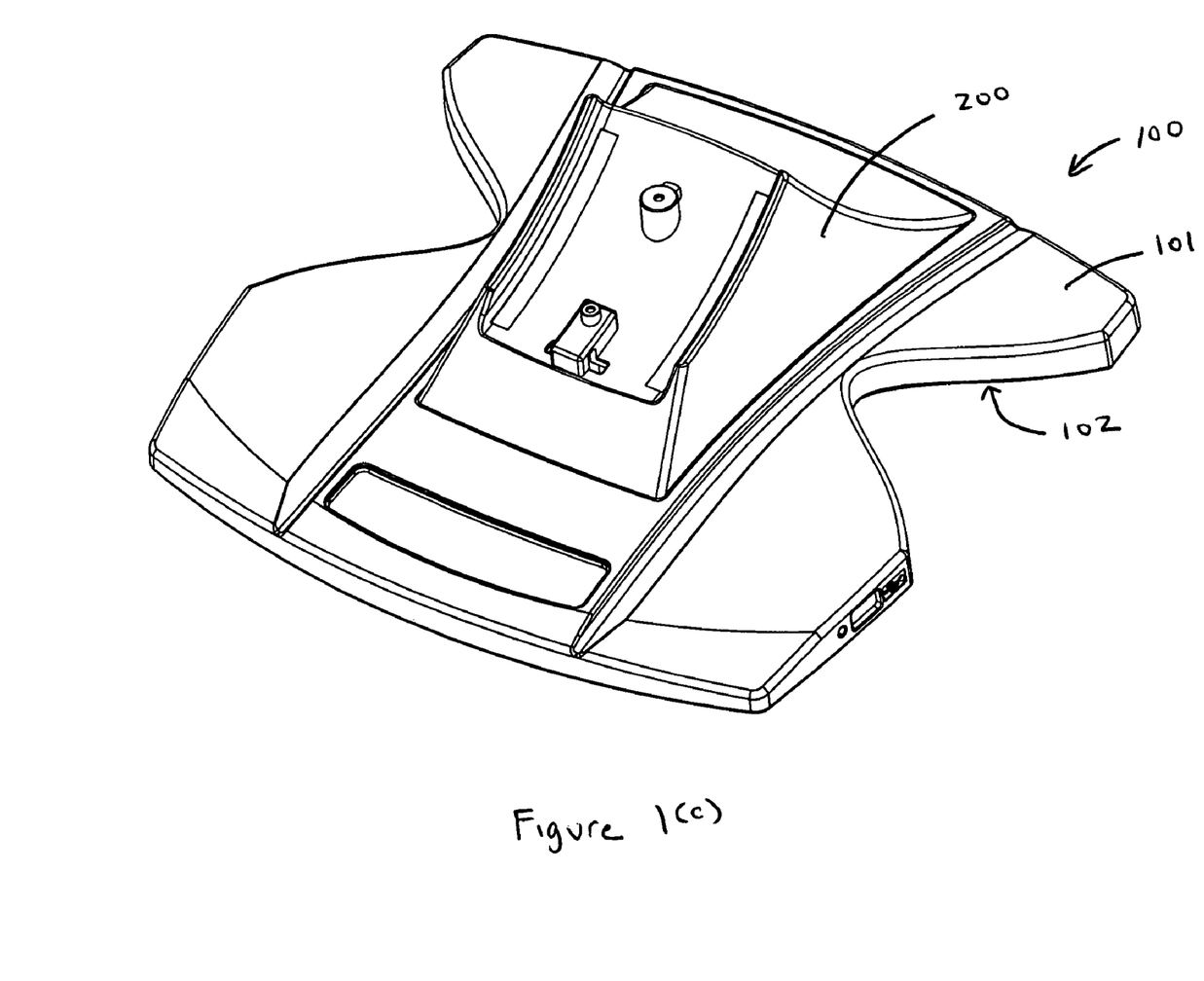
FIG. 1(c) is a perspective view of the base of the laptop computer stand in accordance with the present invention., with the first member coupled thereto.

FIG. 1(c) is a perspective view of the base 100 of the laptop computer stand in accordance with the present invention, with the first member 200 coupled thereto. As seen therein, base 100, has a base top surface 101, a base bottom surface 102, and a plurality of base side surfaces.

Figure 2A:
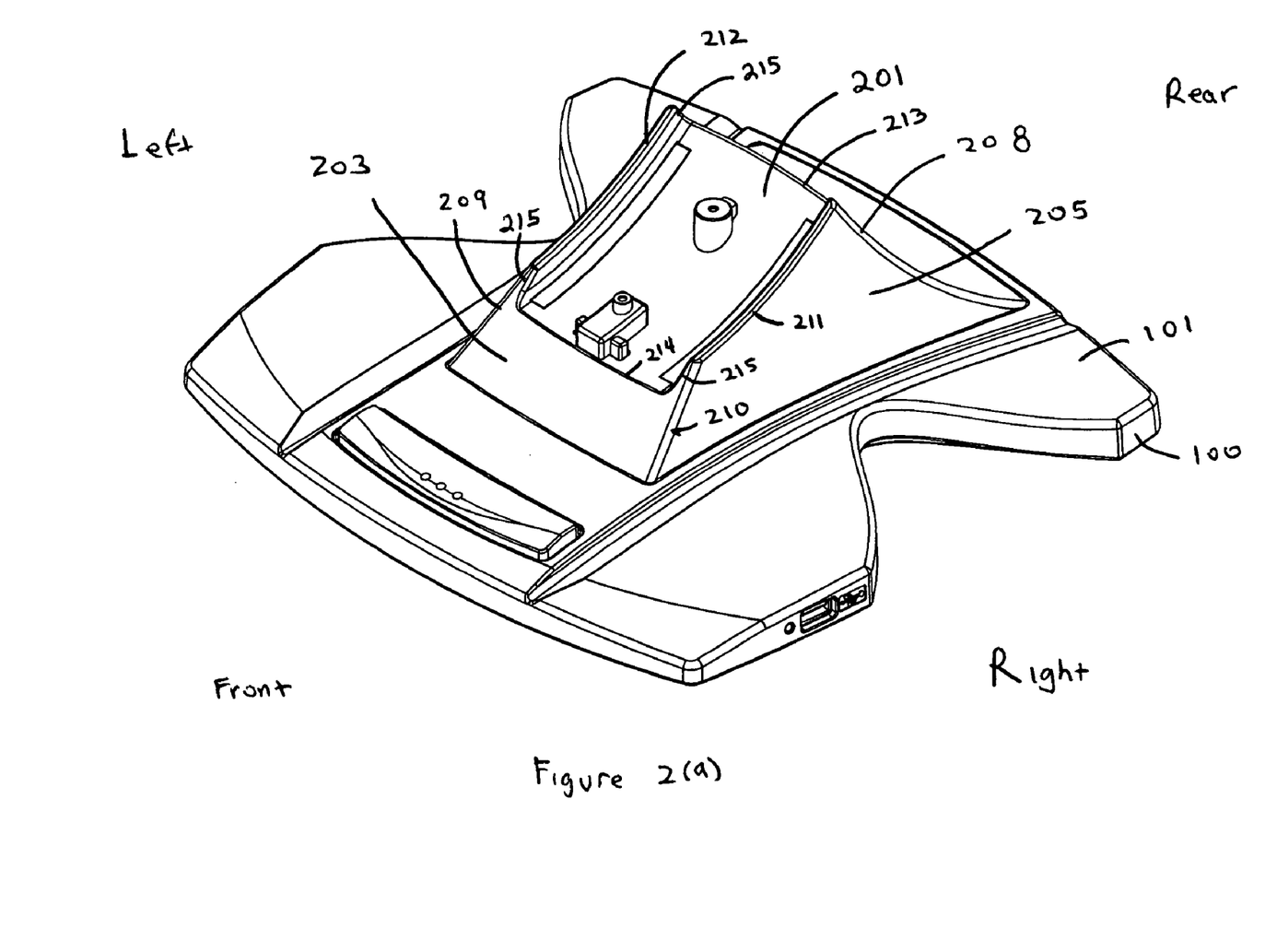
FIG. 2(a) is a front perspective view of the first member of the laptop computer stand in accordance with the present invention, as mounted on the base.
Figure 2B:
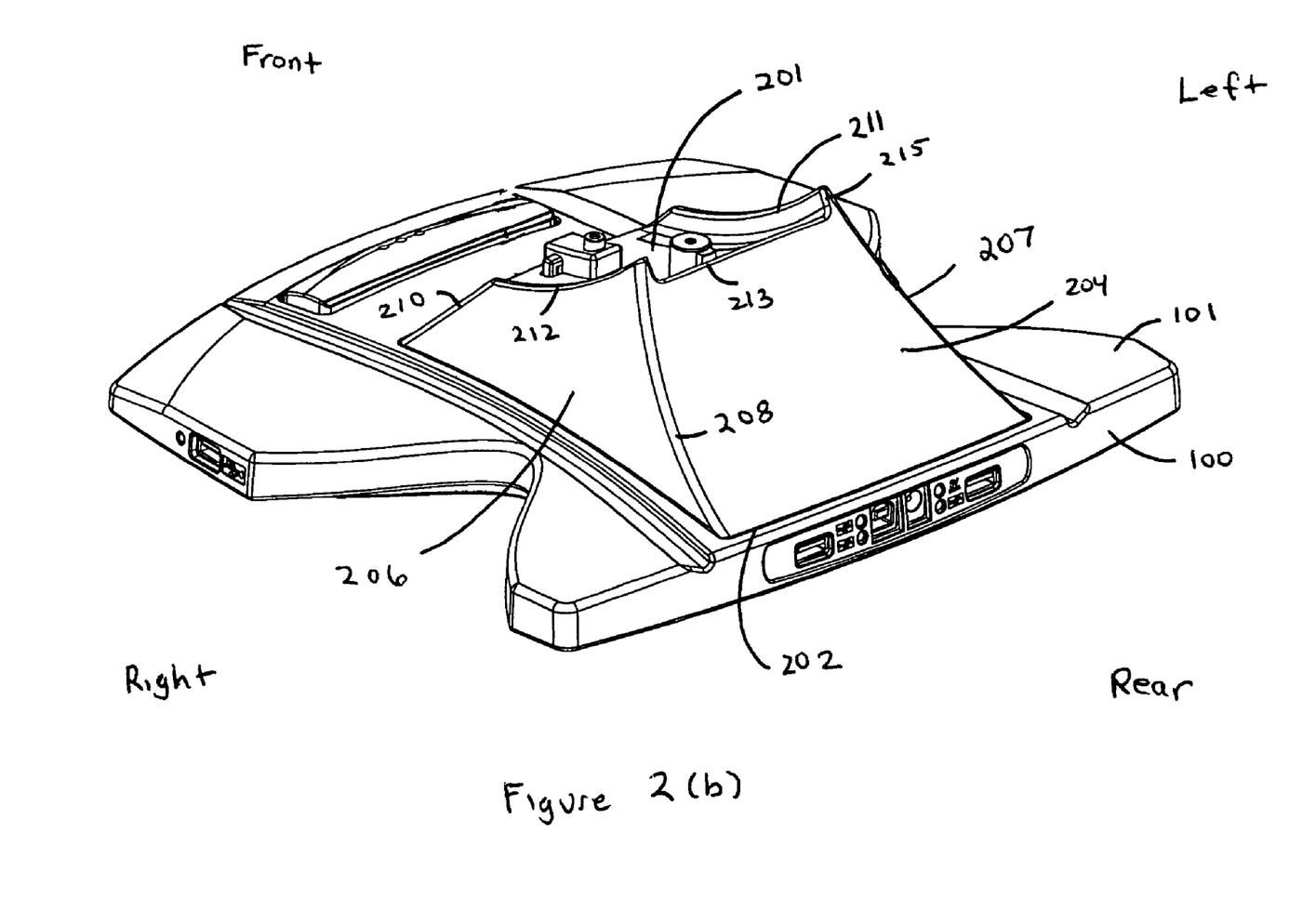
FIG. 2(b) is a rear perspective view of the first member of the laptop computer stand in accordance with the present invention, as mounted on the base.

FIG. 2(a) is a front perspective view and FIG. 2(b) is a rear perspective view, of the first member 200 of the laptop computer stand in accordance with the present invention, as mounted on base 100. Said first member 200 has a substantially rhomboid shape with first member top 201, first member bottom 202 and four sides. The four sides comprise first member front side 203, first member back side 204, first member left side 205 and first member right side 206. The first member 200 is mounted on base 100, more specifically, first member bottom 202 is mounted to the base top surface 101.

The four sides of first member 200 are coupled to have four corners. The four corners are left back corner 207 where the first member left side 205 and first member back side 204 meet orthogonally, a right back corner 208 where the first member right side 206 and first member back side 204 meet orthogonally, left front corner 209 where the first member left side 205 and first member front side 203 meet orthogonally, and a right front corner 210 where the first member right side 206 and first member front side 203 meet orthogonally.

The height of the left back corner 207 and right back corner 208 are substantially the same. The height of the left front corner 209 and right front corner 210 are substantially the same. The height of the left back corner 207 is about 1.5 to 3 times the height of the left front corner 209. The height of the right back corner 208 is about 1.5 to 3 times the height of the right front corner 210.

Each of the top edges 211, 212 of the first member left side 205 and first member right side 206, respectively, have a inward concave curvature from the back to the front thereof. Each of the top edges 213, 214 of each of the first member back side 204 and first member front side 203, respectively, are substantially straight, each being substantially parallel to the base top surface 101, provided that at the termination of each end on the left side and the right side, a guide 215 is formed. The integral molding of the four sides of first member 200 form first member top 201 having a concave shape along the axis on the left side thereof and right side thereof.

Figure 3A:
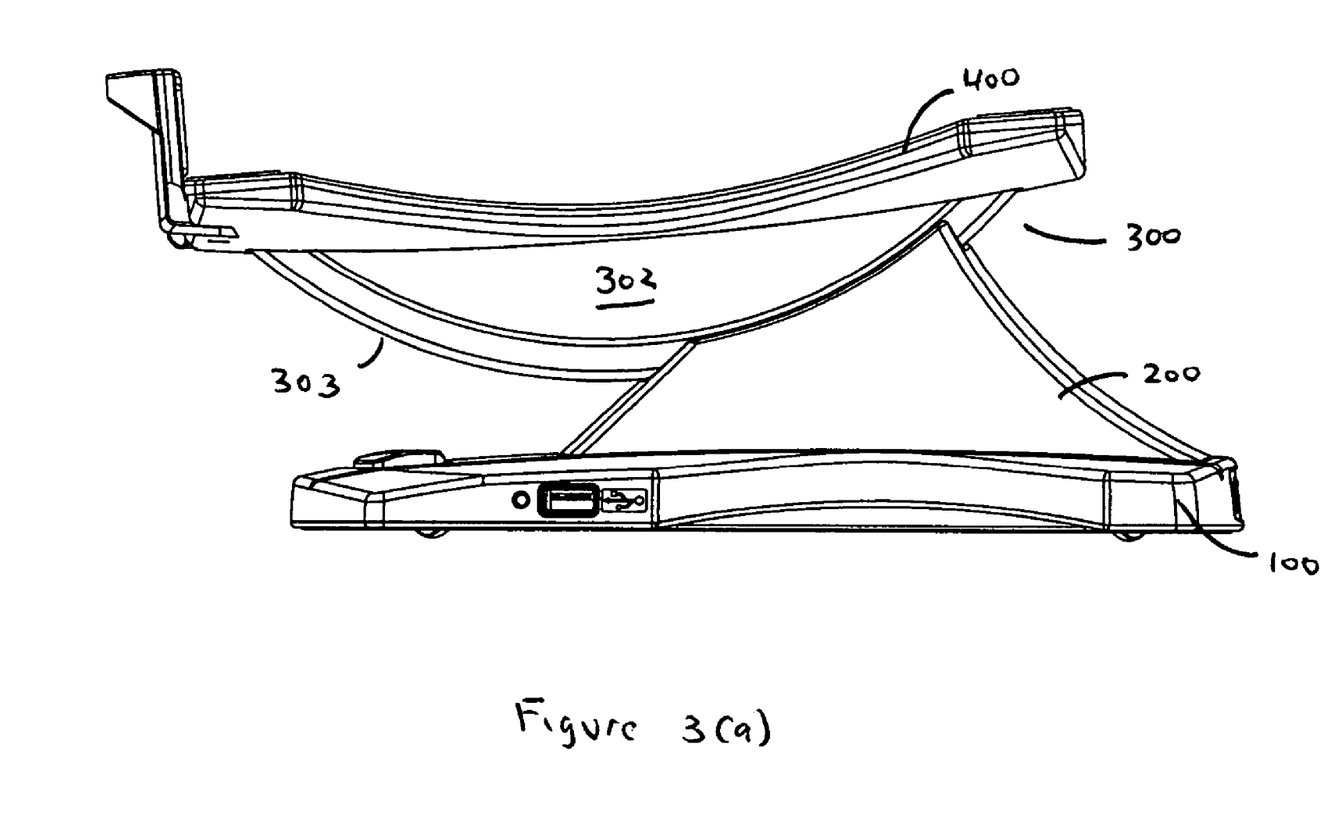
FIG. 3(a) is a right side view of the second member of the laptop computer stand in accordance with the present invention.
Figure 3B:
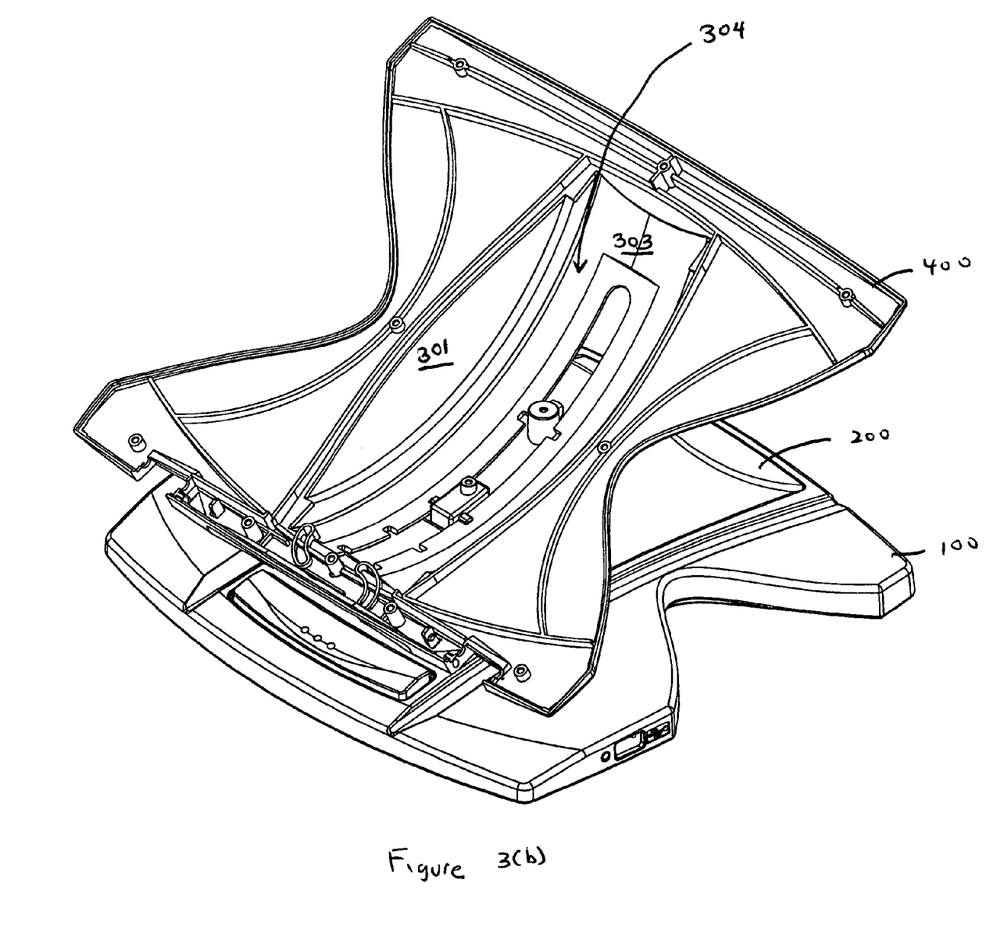
FIG. 3(b) is a top perspective cutaway view of the second member of the laptop computer stand in accordance with the present invention.

FIG. 3(a) is a right side view of the second member 300 of the laptop computer stand in accordance with the present invention. As seen therein, and in FIG. 3(b) which is a cutaway top perspective view of the present invention, second member 300 has at least two sides, second member left side 301 and second member right side 302, and second member bottom 303, second member bottom 303 having a convex surface. Second member left side 301 and second member right side 302 are formed integral and orthogonal to second bottom 303 so as to form second member open top 304. The rate of curvature of the second member bottom 303 and the first member top 201 are substantially equal in absolute value so as to permit the second member bottom 303 to be received and mated with the first member top 201. The arc length of the convex shaped portion of the second member bottom is about 1.5 to 5 times the arc length of the concave shaped portion of the first member top 201.

Figure 4A:
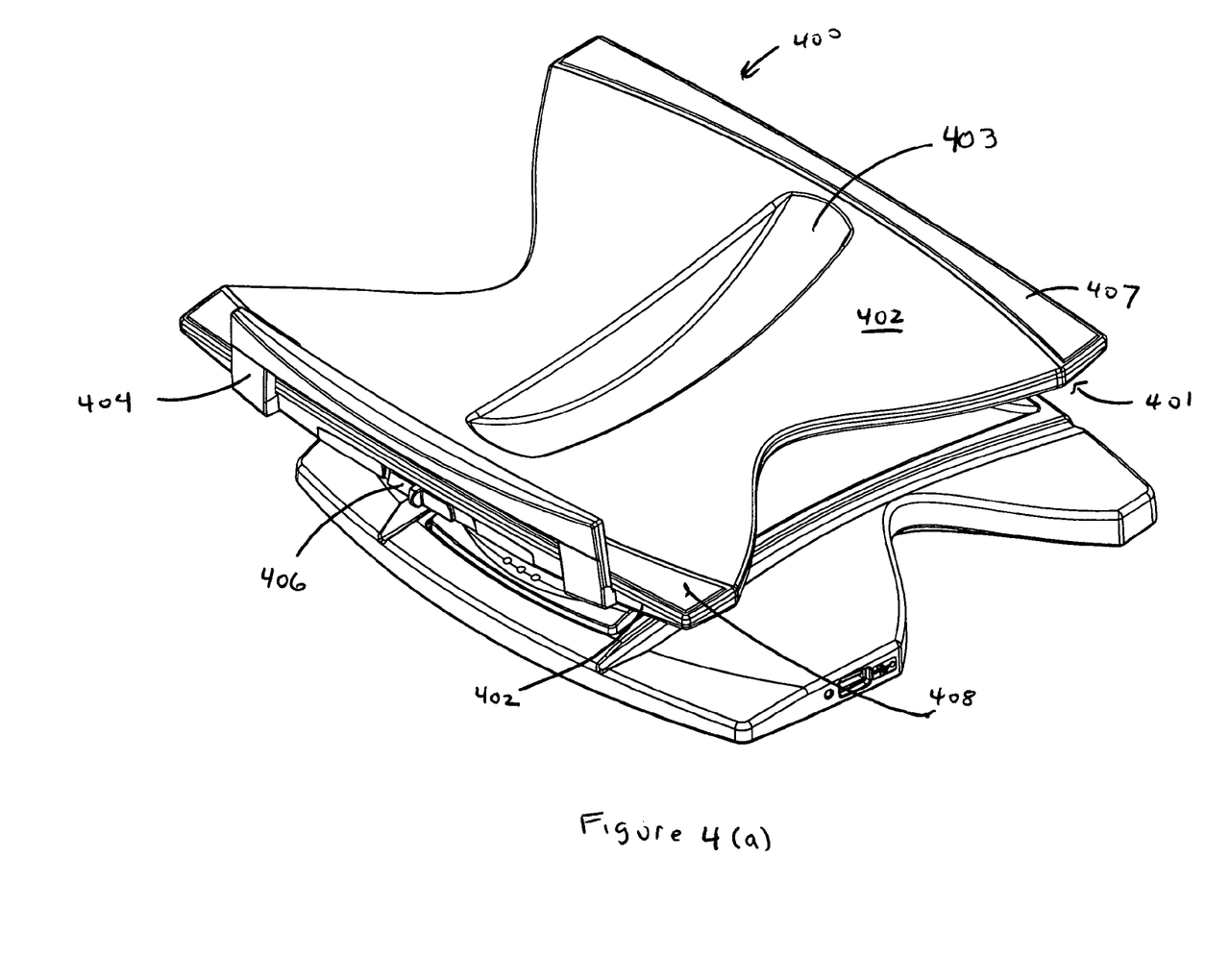
FIG. 4(a) is a top perspective view of the backboard cradle of the laptop computer stand in accordance with the present invention.
Figure 4B:
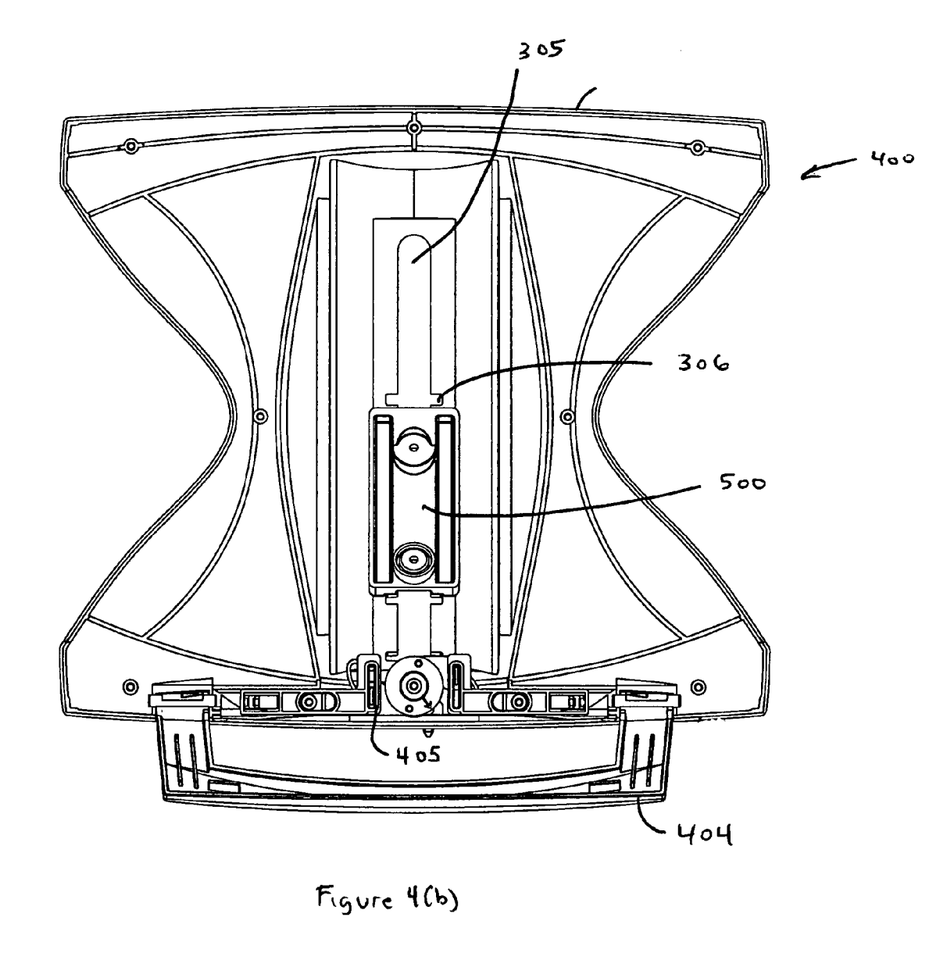
FIG. 4(b) is an interior view of the backboard cradle of the laptop computer stand in accordance with the present invention.

FIG. 4(a) is a top perspective view of the backboard cradle 400 of the laptop computer stand in accordance with the present invention. As seen therein, and in the interior view of backboard cradle 400 of FIG. 4(b), the backboard cradle has a cradle front 402 and a cradle back 401 and a plurality of sides. A pivotably connected truss 404 is coupled to the cradle front 402 of the backboard cradle 400. Within the backboard cradle 400, truss 404 is connected to a truss mechanism 405. Truss release 406 is operable to release the truss from its closed position to its open position. Truss 404 is operable to keep the laptop or tablet computer from sliding off the backboard cradle 400 when the backboard cradle 400 is in the full height position. In the exemplary embodiment of the present invention, a swale 403 is provided on the cradle front 402, said swale 403 extending into the void formed by the walls of the second member 300. The swale is operable to cool the computer to improve system speeds and computer life span. Non-skid rubber pads may located on, or along the edges of the cradle front 402. As seen in FIG. 4(a), these are seen as top skid 407 and bottom skid 408.

Figure 5:
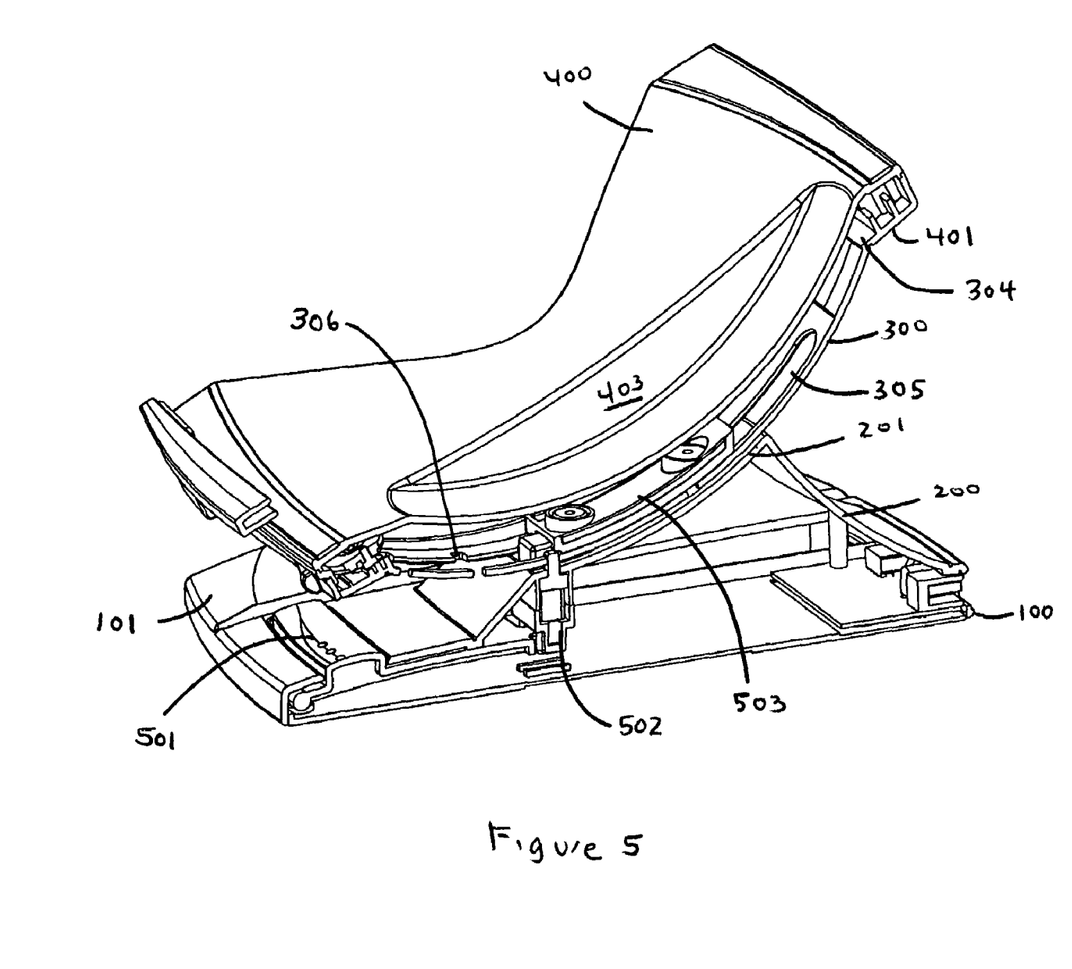
FIG. 5 is a cutaway perspective view of the laptop computer stand in accordance with the present invention.

FIG. 5 is a cutaway perspective view of the laptop computer stand in accordance with the present invention. The second member 300 is mounted to the cradle back 401 of backboard cradle 400 at the second member open top 304. The placement of the convex shaped surface portion of the second member 300 on top of the concave shaped portion of the first member top 201 allows the second member 300 to slide along the first member 200 from a first position to a final position. A first position is when the back of second member 300 is at its closest position to the back of first member 200.

Figure 6:
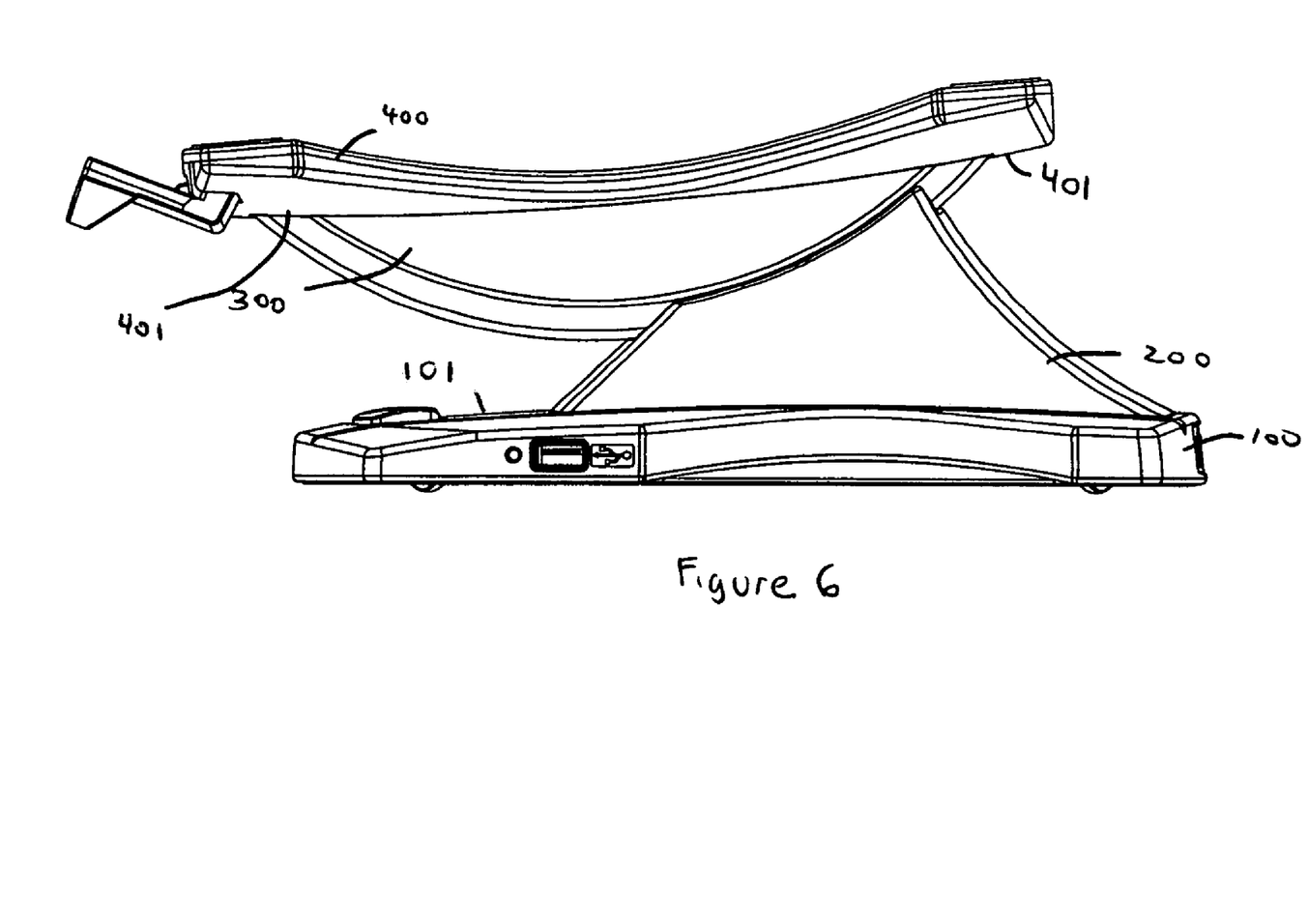
FIG. 6 illustrates a side view of a laptop computer stand in the fully reclined position in accordance with the present invention.

FIG. 6 is a side view of a laptop computer stand in the fully reclined position in accordance with the present invention. As seen therein, in the first position, the base top surface 101 of the base 100 is essentially facing and parallel to the cradle back 401. This is referred to as the fully reclined position.

Figure 7:
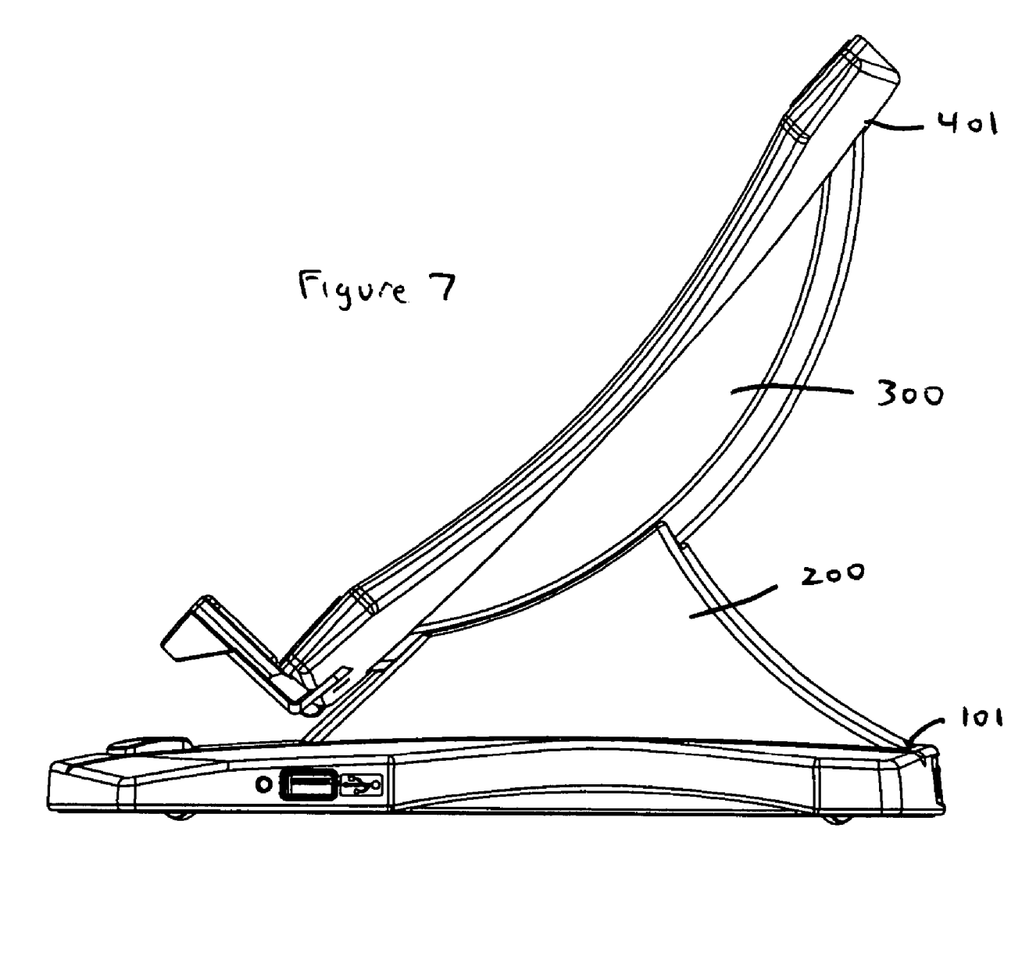
FIG. 7 illustrates a side view of a laptop computer stand in the full height position in accordance with the present invention.

FIG. 7 is a side view of a laptop computer stand in the full height position in accordance with the present invention. As seen therein, a final position is when the front of second member 300 is at its closest position to the front of first member 200. In this position, the cradle back 401 is at about a 60 degree to 85 degree angle to the base top surface 101. This is referred to as the full height position.

Referring back to FIG. 4(b), the convex surface of the second member bottom 303 has disposed therein a longitudinal prolate shaped cut-out, referred to as slot 305, with at least one notch 306, adapted to receive a portion of a locking mechanism 500. The locking mechanism 500 is adapted to hold the backboard cradle 400 in a preferred angled position with reference to the base 100.

Referring back to FIG. 5, base 100 and first member 200 have located therethrough locking mechanism 500, comprising a release button 501 located on the base top surface 101, coupled to a release mechanism 502, said release mechanism being coupled to latch 503. The release mechanism 502 is located within and through the interior of base 100 and the interior of first member 200. The latch 503 extends into slot 305, the locking mechanism 500 adapted to lock and unlock the slidable coupled second member 300 from the first member 200. The arrangement of latch 503 into slot 305 are operable to provide stops for the backboard cradle 400 at the fully reclined position at one extreme to the full height position at the other extreme.

Figure 8:
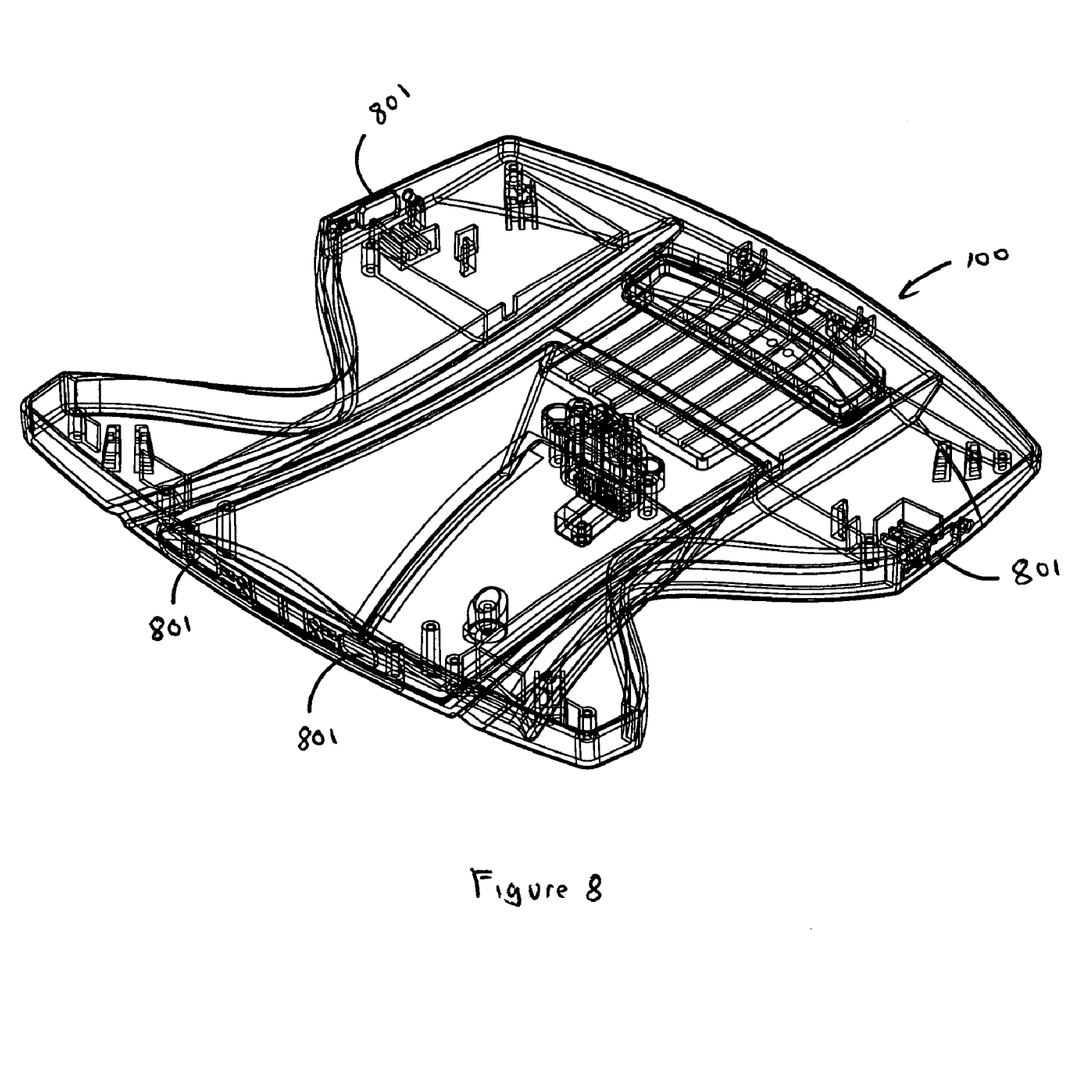
FIG. 8 illustrates a cutaway view of the base laptop computer stand in accordance with the present invention.

FIG. 8 illustrates a cutaway view of the base of the laptop computer in accordance with the present invention. As seen therein, base 100 has located along its sides a plurality of input and output, power and data ports 801. These ports can be active and/or passive USB data ports, serial data ports, power input ports and the like. In this manner, peripherals can be coupled through the computer stand increasing data throughput speeds. In one embodiment of the present invention, a plurality of rear access USB 2.0 ports are available for keyboards, mice and other peripherals. In addition, optional side access USB 2.0 ports can be located on the sides of base 100 for quick connect of accessories such as digital camera or MP3 players. Additional ports may be located through the first member 200.

Figure 9:
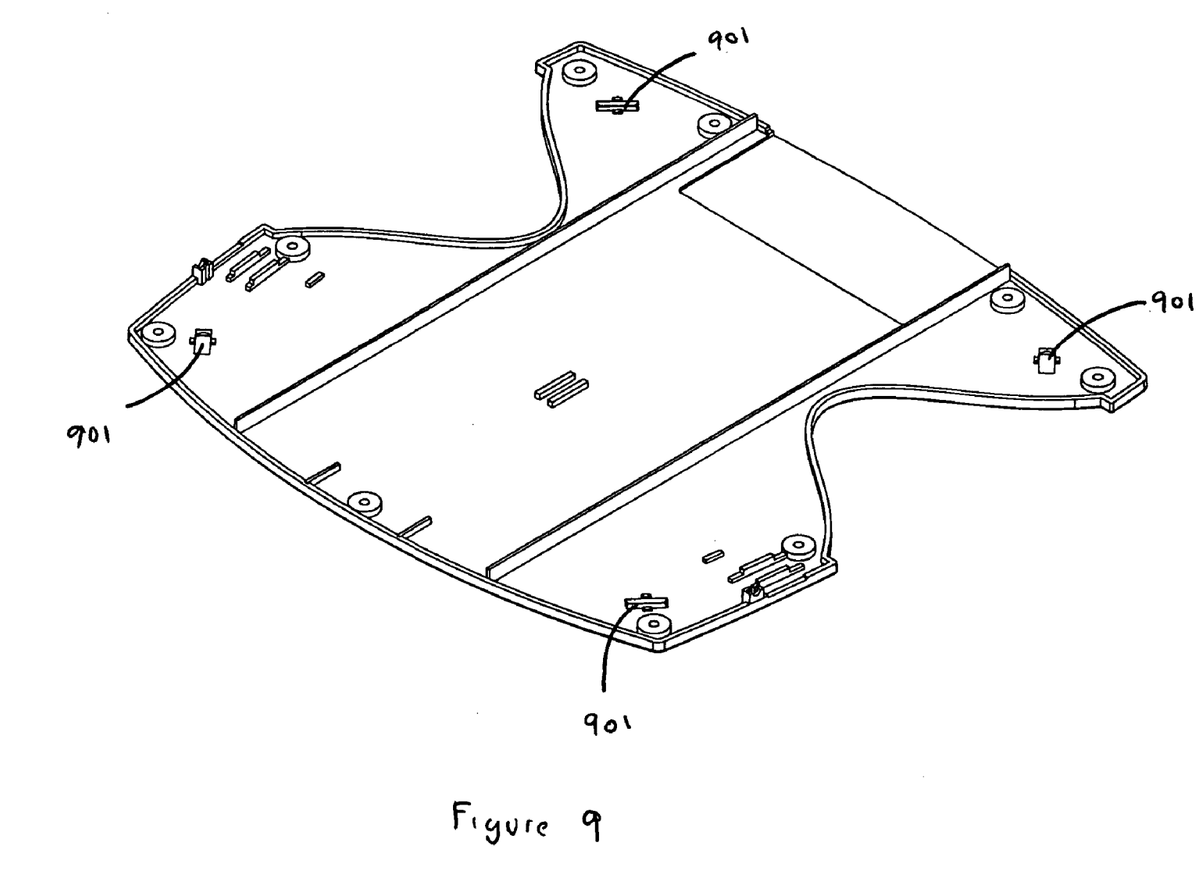
FIG. 9 illustrates an interior view of the base of the laptop computer stand in accordance with the present invention.
Figure 10:
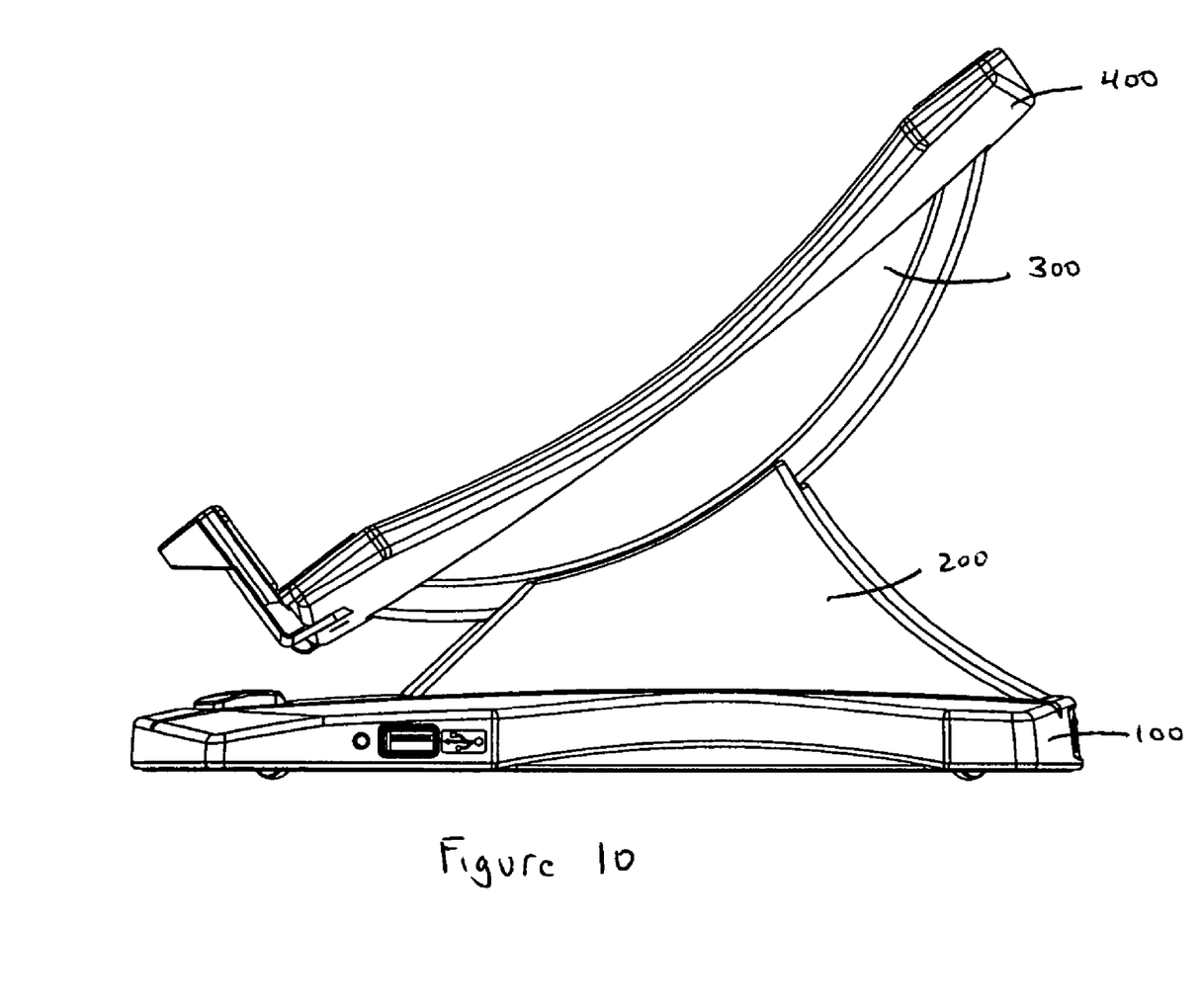
FIG. 10 illustrates a side view of a laptop computer stand in the mid-height position in accordance with the present invention.

FIG. 9 illustrates an interior view of the base of the laptop computer stand in accordance with the present invention. As seen therein, the base can have located about the four corners thereof, through the base bottom surface 102, rotatable wheels or on the base of the bottom surface 102, non-skid pads. FIG. 10 illustrates a side view of a laptop computer stand in the mid-height position with a laptop located thereon in accordance with the present invention. As seen in FIG. 10, the ability of the user to adjust the angle of the keyboard and screen increases user comfort and productivity. In one embodiment of the present invention, three height positions and keyboard angles are selectable by the user. Further, backboard cradle can be used to convert a laptop computer into a flat panel display, eliminating the need to purchase an external monitor for a laptop or tablet computer. The present invention is operable to transform a notebook computer or tablet computer into a flexible desktop computer replacement.

The innovative teachings of the present invention are described with particular reference to its use as a laptop or tablet computer stand and connectivity port. It should be understood and appreciated by those skilled in the art that the embodiment described herein provides only one example of the many advantageous uses and innovative teachings herein. For example, the connectivity functionality can be accomplished using a plurality of input and output ports. Various alterations, modifications and substitutions can be made to the process of the disclosed invention and the apparatus' that implement the present invention without departing in any way from the spirit and scope of the invention.

I claim:

1. A notebook computer stand, comprising:
   a support member adapted to support a notebook computer and selectively elevate the notebook computer;
   said support member further comprising
      a base;
      a first member;
      a second member; and
      a backboard cradle;
   said first member being coupled to the base;
   said second member being coupled to the backboard cradle; and
   said second member being arcuately, slidably coupled to the first member so as to permit the backboard cradle to be adjustably angled with respect to the base.

2. The stand of claim 1, further comprising the backboard cradle having a front side and a back side and a plurality of sides;
   said second member being mounted to the back side of the backboard cradle;
      said front side of the backboard cradle having a truss adapted to support a laptop computer.

3. The stand of claim 1, further comprising a swale located approximately from the bottom edge of the backboard cradle to the top edge of the backboard cradle.

4. The stand of claim 3, further comprising the base having a plurality of input and output data and power ports.

5. The stand of claim 4, further comprising at least one active USB data port, at least one passive USB data port and at least one power input port.

6. The stand of claim 1, further comprising the base having a bottom surface with four corners; and
   four wheels located about the four corners of the bottom surface.

7. The stand of claim 1, further comprising the base having a bottom surface; and
   non-skid pads located about the bottom surface.

8. The stand of claim 1, further comprising a locking mechanism coupling the first member and the second member;
   said locking mechanism operable, when released, to allow the second member to arcuately slide with respect to the first member; and
   said locking mechanism operable, when locked, to hold the second member in a fixed position with respect to the first position.

9. An adjustable stand for mounting a notebook computer or pen-input tablet computer comprising:
   a base;
   a first member;
   a second member; and
   a backboard cradle;
   the base having
      a base top surface;
      a base bottom surface;
      a plurality of base side surfaces;
   the first member having a substantially rhomboid shape comprising;
      a first member top;
      a first member bottom;
      and four sides, said four sides comprising
         a first member front side;
         a first member back side;
         a first member left side;
         and a first member right side;
      the first member bottom being mounted to the base top surface;
      the four sides of first member having four corners, comprising
         a left back corner where the first member left side and first member back side meet orthogonally;
         a right back corner where the first member right side and first member back side meet orthogonally;
         a left front corner where the first member left side and first member front side meet orthogonally;
         a right front corner where the first member right side and first member front side meet orthogonally;
         the height of the left back corner and right back corner being substantially equal;
         the height of the left front corner and right front corner being substantially equal;
         the height of the left back corner being about 1.5 to 3 times the height of the left front corner;
         the height of the right back corner being about 1.5 to 3 times the height of the right front corner;
         each of the top edges of the first member left side and first member right side having an inward concave curvature from the back to the front thereof;
         each of the top edges of each of the first member back side and first member front side being substantially straight and substantially parallel to the base top surface;

there being a guide formed at the terminating ends of the left side and the right side;
the integral molding of the four sides of first member forming the first member open top having a two sides thereof in a concave curvature shape;
the second member having at least two sides;
a second member left side;
a second member right side;
a second member bottom, said second member bottom having a convex surface;
second member left side and second member right side being formed integral and orthogonal to second bottom so as to form second member open top;
the rate of curvature of the second member bottom and the first member open top being substantially equal in absolute value so as to permit the second member bottom to be received and mated with the first member open top;
the arc length of the convex shaped portion of the second member open top being about 1.5 to 5 times the arc length of the concave shaped portion of the second member bottom;
the backboard cradle comprising;
a cradle front;
a cradle back;
a plurality of sides
a pivotably connected truss coupled to the cradle front;
a truss mechanism being located within the backboard cradle;
a truss release coupled to the truss mechanism operable to release the truss from its closed position to its open position;
the truss operable to keep the laptop or tablet computer from sliding off the backboard cradle when the backboard cradle is in a full height position;
the second member being mounted to the cradle back of the backboard cradle at the second member open top;
the convex surface portion of the second member being placed on top of the concave shaped portion of the first member open top, operable to allow the second member to slide along the first member from a first position to a final position;
the first position being when the back of the second member is at its closest position to the back of first member operable to orient the cradle back essentially facing and parallel to the base top surface of the base; and
the final position being when the front of second member is at its closest position to the front of first member, operable to orient the cradle back at about a 60 degree to 85 degree angle to the base top surface.

10. The adjustable stand of claim 9, further comprising:
a locking mechanism adapted to hold the backboard cradle in a preferred angled position with reference to the base;
the locking mechanism comprising a release mechanism with a first end and second end;
a release button;
a latch;
the release button being responsively coupled to a first end of the release mechanism;
the latch being responsively coupled to a second end of the release mechanism;
the release button located on or about the base;
the release mechanism being located within and through the interior of the base and the interior of first member;
a longitudinal prolate shaped cut-out or slot in the convex surface of the second member bottom;
the slot having at least one notch adapted to receive the latch portion of the release mechanism;
the latch extending into slot;
the locking mechanism adapted to lock and unlock the slidable coupled second member from the first member.

11. The adjustable stand of claim 10, further comprising the arrangement of latch into at least one slot operable to provide stops for the backboard cradle at the fully reclined position at one extreme to the full height position at the other extreme.

12. The adjustable stand of claim 9, further comprising a plurality of input and output, power and data ports located on the stand.

13. The adjustable stand of claim 12, further comprising a plurality of input and output, power and data ports located on the base.

14. The adjustable stand of claim 13, wherein said plurality of input and output, power and data ports are located along the sides of the base.

15. The adjustable stand of claim 12, wherein said plurality of input and output, power and data ports are located on the first member.

16. The adjustable stand of claim 12, wherein said plurality of input and output, power and data ports comprise active and/or passive USB data ports, serial data ports, power input ports and the like.

17. The adjustable stand of claim 16, wherein the dataports are adapted to receive keyboards, mice, digital camera or MP3 players.

18. The adjustable stand of claim 9, further comprising rotatable wheels being located on the base bottom.

19. The adjustable stand of claim 9, further comprising non-skid pads being located on the base bottom.

20. The adjustable stand of claim 9 further comprising non-skid pads being located on the cradle front.

21. The adjustable stand of claim 9 further comprising being fabricated substantially from a resilient plastic.

22. The adjustable stand of claim 9, further comprising a swale being located on the cradle front;
the swale extending into the void formed by the walls of the second member; and
the swale being operable to allow air to circulate beneath the bottom of the computer.

* * * * *